United States Patent [19] [11] 3,833,926
Hall [45] Sept. 3, 1974

[54] MAGNETIC DISC RECORDER AND CASSETTE WITH COMPLIANT RECORDING DISC HAVING FLEXIBLE SUPPORT MEANS

[75] Inventor: Robert P. Hall, Auburn, Calif.

[73] Assignee: Arvin Industries, Inc, Columbus, Ind.

[22] Filed: Nov. 10, 1972

[21] Appl. No.: 305,335

Related U.S. Application Data

[63] Continuation-in-part of Ser. No. 266,582, June 27, 1972, abandoned.

[52] U.S. Cl. .......... 360/135
[51] Int. Cl. .......... G11b 5/82
[58] Field of Search .......... 179/100.2 Z, 100.2 CA, 179/100.2 T, 100.2 P; 178/6.6 DD; 340/174.1 C, 174.1 E; 274/4 H

[56] References Cited

UNITED STATES PATENTS

| | | | |
|---|---|---|---|
| 3,324,281 | 6/1967 | Morse | 340/174.1 C |
| 3,416,150 | 12/1968 | Lindberg | 340/174.1 C |
| 3,492,005 | 1/1970 | Ueno et al. | 179/100.2 Z |
| 3,593,327 | 7/1971 | Shill | 179/100.2 Z |
| 3,609,722 | 9/1971 | Zenzefillis | 179/100.2 Z |
| 3,678,481 | 7/1972 | Dalziel et al. | 179/100.2 Z |

*Primary Examiner*—Vincent P. Canney
*Assistant Examiner*—Robert S. Tupper
*Attorney, Agent, or Firm*—Biebel, French & Bugg

[57] ABSTRACT

A novel magnetic disc recording cassette is provided as a thin polygonal cassette housing containing a disc of flexible magnetic recording media. A drive hub attached to the media is exposed through the cassette and cooperates with a complementary drive hub in a deck which receives the cassette in slot-loading fashion into a carriage which in turn positions the cassette for driving of the recording disc. The cassette and disc may be single or double sided, and includes access opening for a magnetic transducer to follow different circular tracks, or a helical track. The thin magnetic disc is provided with backing in the cassette to assure compliant interface of the transducer with the magnetic recording disc. The backing may be a backing sheet, discs of backing material, or felt surfaced shims adjacent the region of interface with the transducer. Passages are provided for air flow in response to rotation of the recording disc to provide a continuing smooth and minimum friction rotation of the disc within the cassette. The cassette is supported either on the base of the carriage or by a separately adjustable three point suspension system.

11 Claims, 24 Drawing Figures

FIG-15
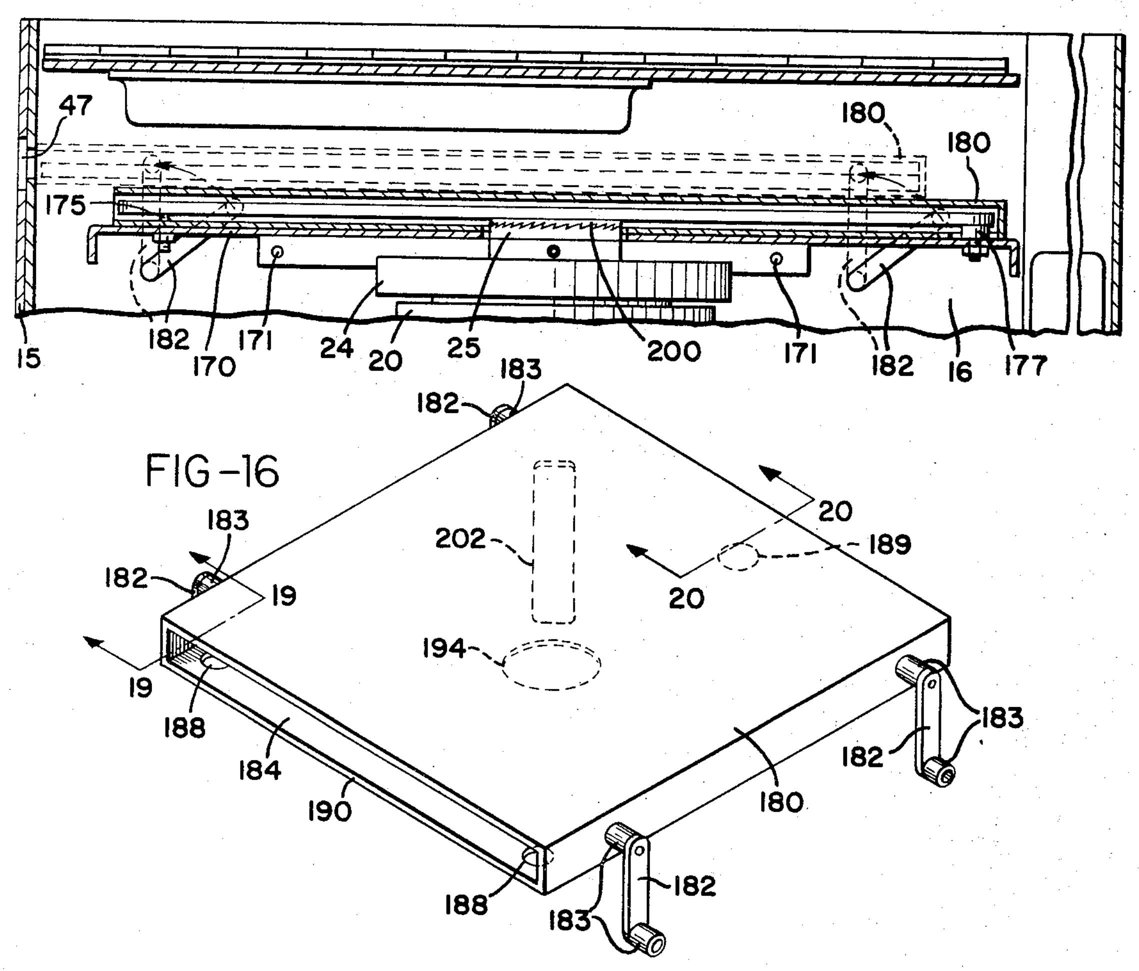
FIG-15, FIG-16
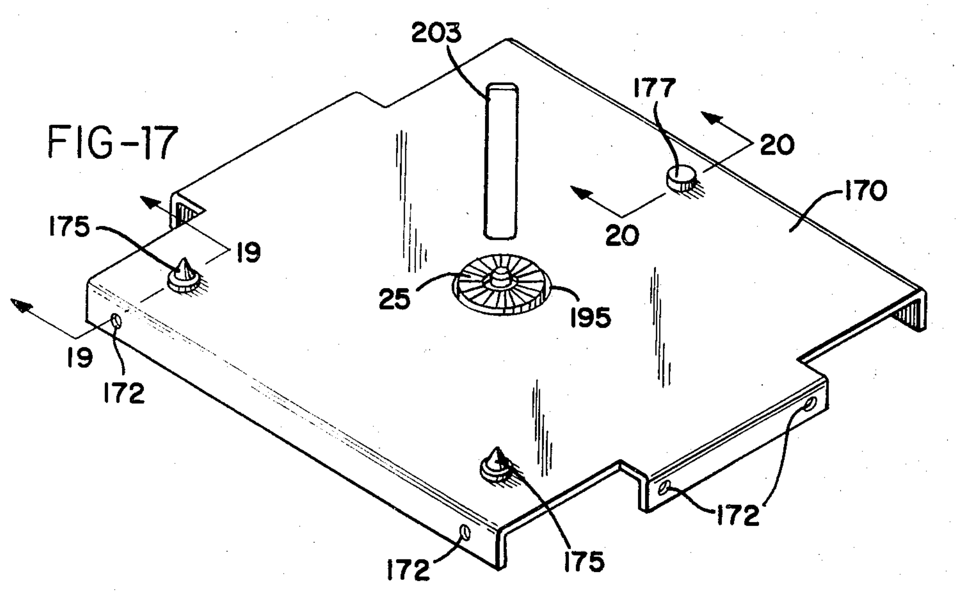
FIG-17

MAGNETIC DISC RECORDER AND CASSETTE WITH COMPLIANT RECORDING DISC HAVING FLEXIBLE SUPPORT MEANS

CROSS REFERENCE TO RELATED APPLICATION

This invention is a continuation-in-part of co-pending U.S. application, Ser. No. 266,582, filed June 27, 1972, now abandoned, entitled Magnetic Disc Recorder and Magnetic Disc Cassette.

BACKGROUND OF THE INVENTION

In general, magnetic recording discs can be classified as of the rigid and the flexible or non-rigid type, with the predominance being toward the rigid type which generally comprises a magnetizable coating or surface placed on a rigid plate or platter. Various suggestions have been made for flexible recording discs, but in general these have been of a type where the flexible material was mounted or fastened to a more rigid platter or plate, and various arrangements were provided to move the flexible magnetic disc at some point on its surface toward a magnetic transducer.

The rigid recording discs are expensive and are subject to damage due to "crashes" when the transducer accidentally makes heavy enough contact with the surface so as to mar or scratch the surface, thereby destroying the magnetizable coated surface. Furthermore, it is difficult and expensive to provide such discs which run true in a plane, and continue to do so when exposed to changing conditions of temperature and/or humidity, and which have a uniform magnetizable coating thereon. The mounting and handling of flexible magnetic recording discs has been given little attention. There has been little or no progress in interchangeability of such discs, with the attendant problems of concentricity, proper tracking, and proper interfacing between the transducer and the recording surface of the disc. On the other hand, there is a need for a relatively inexpensive, but accurate, magnetic disc recorder, and particularly recording disc units which are inexpensive to manufacture, but still accurate enough to achieve high fidelity recording, preferably with bandwidth sufficient to record and reproduce video information, for example, in the order of 2 to 4 MHz. bandwidth.

SUMMARY OF THE INVENTION

The present invention relates to a magnetic disc recorder and a magnetic recording cassette which is of simple and relatively inexpensive construction, which accurately loads and unloads the recording cassette in a simple but straightforward manner, and which readily accepts inexpensive cassettes interchangeably. Provision is made for compliant interfacing of the transducer with the flexible recording disc contained within a cassette, such that high fidelity recording and reproduction is possible.

The recorder comprises a slot-loading type of unit in which the cassette is received in a carriage, and the carriage locates the cassette generally with respect to a drive hub, then by movement of the carriage into playing position the recording disc is accurately positioned on the drive hub and coupled thereto. The flexible recording disc within the cassette is accessible through an appropriate opening to a transducer which is mounted for movement along a radius of the recording disc, so as to follow different circular paths, or if desired to follow a helical path, under the control of an appropriate motor. The head is mounted under the influence of an inertial mass which tends to bring the head and the transducer therein into a compliant interface with the flexible recording disc in the cassette. The flexible disc is backed by compliant devices which also achieve the desired interface with the transducer, while allowing the recording disc to deviate locally from its normal plane of rotation, without damaging the recording surface of the flexible disc.

The cassettes may be constructed as two-sided devices, if desired, and may be changed by lifting the carriage away from the drive hub, withdrawing the cassette and inverting it before reinsertion in the carriage. Friction between the thin (0.001 inch) recording disc and the adjoining compliant membranes and other parts of the cassette is kept to a minimum by inducing a flow of air along the surface of the disc during its rotation. This is accomplished in a simple fashion by providing intake openings for air near the hub structure of the cassette, whereupon rotation of the disc will initiate a centrifugal pumping action that causes air entering these openings to flow outwardly along the disc and exit near its periphery.

The cassette preferably is constructed of simple rigid or semi-rigid parts which may conveniently be made of molded plastic materials, and defining a cavity within which the thin recording disc is mounted to rotate, being attached to a special driving hub which is accessible through an opening near the center of the cassette. The construction and arrangement of the cassette and the recording disc therein is of such a simple nature that these cassettes can be inexpensively mass produced and still achieve the desired high fidelity recording and reproduction.

The primary object of the invention is, therefore, to provide a novel magnetic disc recorder of simple and efficient design, and to provide a novel magnetic recording cassette which is readily and interchangeably adaptable for use in the recorder.

Other objects and advantages of the invention will be apparent from the following description, the accompanying drawings and the appended claims.

BRIEF DESCRIPTION OF THE DRAWINGS

FIG. 15 is a cross-sectional view similar to FIG. 2 of a modified form of the magnetic recording system;

FIG. 16 is a perspective view of the cassette carriage shown in FIG. 15;

FIG. 17 is a perspective view of the FIG. 15 carriage support panel showing the three point cassette suspension supports mounted thereon;

DESCRIPTION OF THE PREFERRED EMBODIMENT

Figures 1, 2, 3, 4, 5:
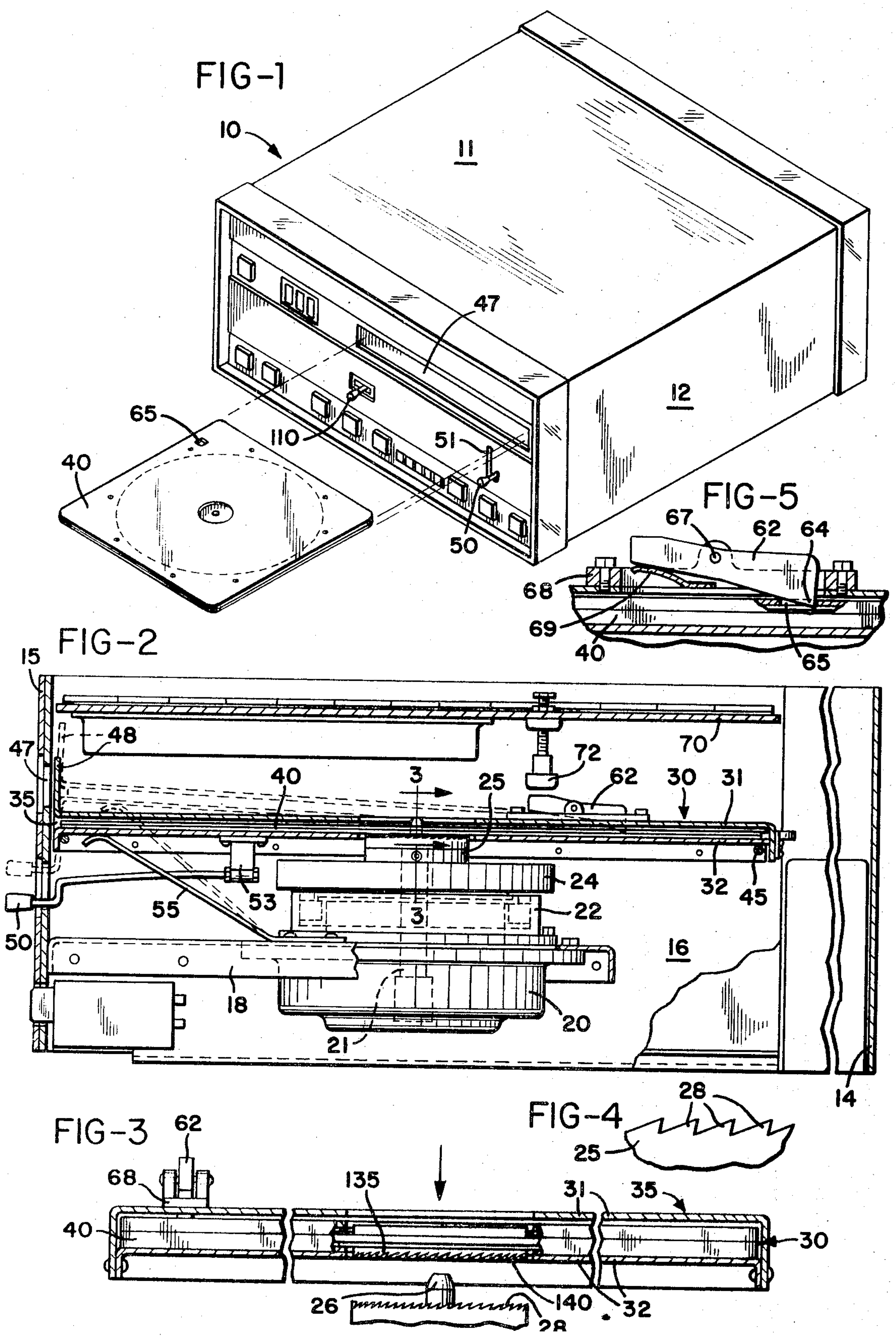
FIG. 1 is a perspective view of a magnetic recording system embodying the invention, showing a cassette which contains a recording media in position to be loaded into the housing of the device.
FIG. 2 is a cross-sectional view taken generally through the center of the housing, with some parts broken away or omitted for purposes of clarity.
FIG. 3 is a cross-sectional view of the cassette carriage and related portions of the drive, taken on line 3—3 in FIG. 2.
FIG. 4 is an enlarged view showing a fragment of the teeth on the drive hub.
FIG. 5 is a detailed cross-sectional view, on an enlarged scale, showing the cassette retaining mechanism which is mounted to the top of the carriage.

Referring to the drawings, and more particularly to FIGS. 1–5, the recording system provided by the invention is contained within a housing 10 having a top 11, sides 12, a rear panel 14, and a front panel or face 15. Within this structure there is fastened an inner mounting bracket 16 which is generally U-shaped in configuration, with its base portion resting behind the front panel 15, one of its sides adjacent to one side panel 12, and the other of its sides extending front to back of the housing between the sides forming a partial partition. A base panel 18 is secured to all three sides of the bracket 16 and is supported within the housing elevated somewhat above its bottom.

The base panel 18 provides support for a drive motor 20 having an output shaft 21 which extends vertically, its axis of rotation being generally parallel to the front and rear of the housing. Attached to the motor shaft 21 is a tachometer 22 which forms part of a control loop to regulate the motor output speed. Above the tachometer, also fastened to shaft 21, there is a flywheel 24, and immediately above it is the output or drive hub 25. The end of shaft 21, in the particular construction shown, extends somewhat through the drive hub and provides a locating means 26 which functions to align the drive hub with elements to be driven. The top or upper face of drive hub 25 has a plurality of radially extending undercut teeth 28 which face coaxially of the shaft 21 arranged in a circle around the face of drive hub 25. These teeth rotate in a fixed plane when motor 20 is running, and the elements of a recording cassette are brought into contact with the drive hub, as will be explained.

Immediately above the motor and its drive hub there is a cassette receiving carriage 30 which comprises top and bottom walls 31 and 32 secured together to define a thin elongated chamber 35 into which a thin rectangular, preferably square, cassette 40 may be inserted. Details of the cassette are described hereafter, and for purposes of the present explanation, it should merely be noted that the cassette includes an exposed rotatable driven hub 135, also having undercut teeth 140, the driven hub constructed as a complement to the driving hub 25 so that the two hubs may readily engage for the purpose of moving a recording media within the cassette 40. In one successful embodiment, the cassette 40 was constructed as a hollow essentially rigid member of about ten inches square, having a thickness of less than ¼ inch.

The carriage 30 is supported at its rear by a pivot or hinge rod 45 which extends through suitable bushings 46 in the sides of the support bracket 16. This supports the carriage for pivotal movement between a playing position which is shown in full lines in FIG. 2, and a loading or unloading position shown in dash lines, where the cassette receiving chamber 35 is generally aligned with a loading opening 47 in the front panel 15. In the playing position an upward extension 48 of the carriage top wall 31 provides a cover for the opening 47. A control handle 50 extends through a slot 51 in the front panel 15 and is fastened to a small bracket 53 on the bottom wall 32 of the carriage. Leaf spring 55, which is fixed to the base panel 18, presses against the underside of carriage 30, urging it toward the loading position. This slot 51 includes a lateral extension into which a portion of the handle 50 can engage, locking the carriage in the playing position.

A retaining mechanism, shown in greater detail in FIG. 5, functions to locate the cassette in the chamber 35 against the force of an ejector spring 60 which is secured to the rear of carriage 30 and includes a portion 61 projecting into the rear of the chamber 35 to engage and press against an edge of the cassette 40. The retainer mechanism includes a latch 62 having a corner 64 which is normally urged through an opening in the upper wall 31 of the carriage to engage within a notch 65 formed in the cassette 40. The latch member 62 is mounted on a pivot pin 67 which in turn is supported on a mounting block 68 fastened to the top wall 31 of the carriage. A small leaf spring 69 is secured within the mounting block 68 and presses against the pivoting latch member 62, urging it into the retaining position shown in FIG. 4. The upper panel 70, which is supported beneath the top 11 of the housing, has a depending stop 72 aligned with the latch member 62 such that when the carriage is raised to the loading position, the latch member 62 will engage stop 72, pivot againt the spring 69, and move the corner 64 out of the notch in the cassette, permitting the ejector spring 60 to eject the cassette partially through the loading opening 47 as the open front end of the carriage comes into alignment with the loading opening. To reverse the procedure for loading, it is necessary only to hold the cassette in the chamber 35 as the carriage begins to be lowered, and the retainer mechanism will engage the notch 65 as the carriage leaves the loading position.

Figure 6:
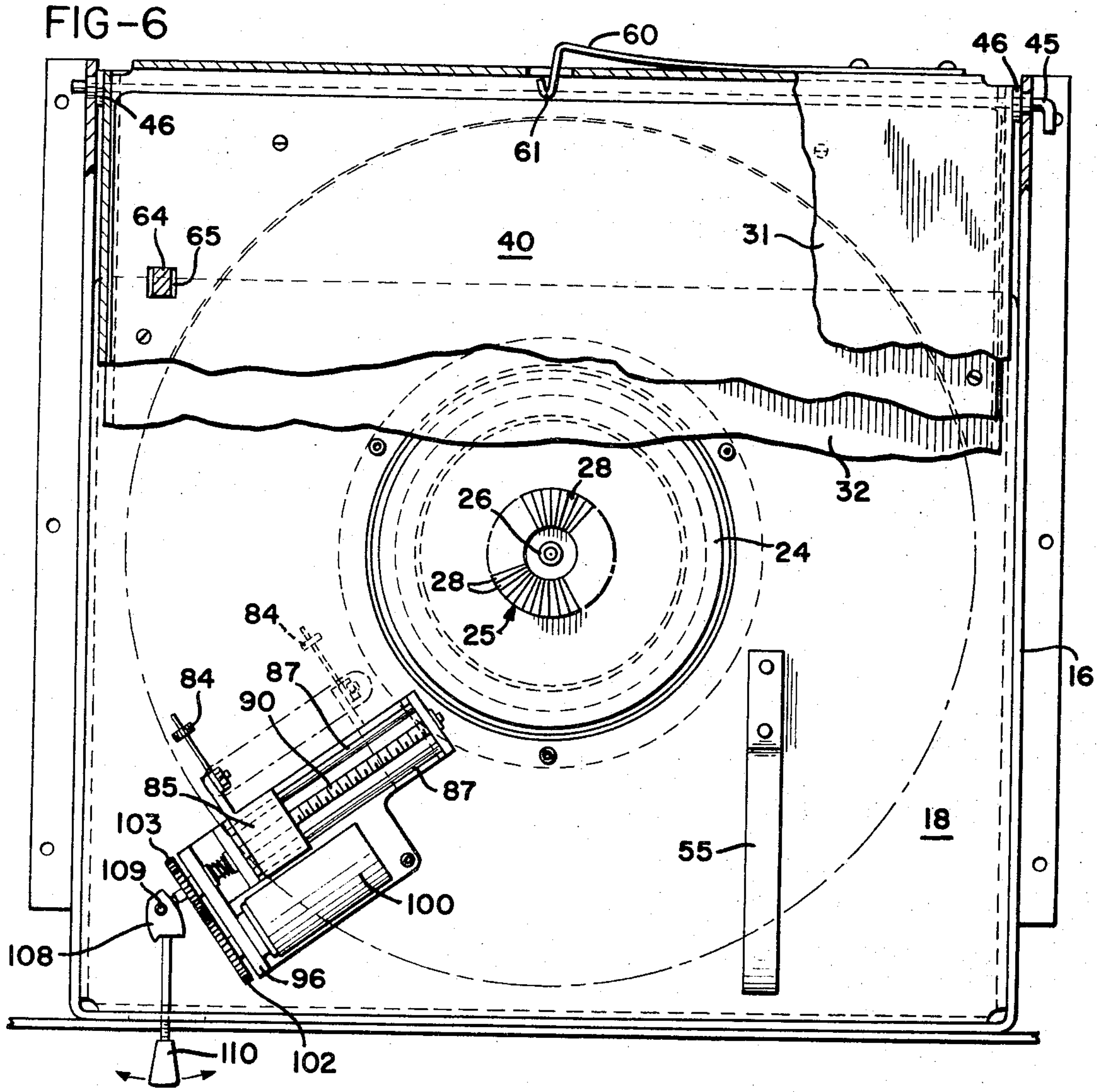
FIG. 6 is a plan view of the central portion of the carriage and drive mechanism, with portions of the carriage and of the cassette broken away to show the face of the drive hub and the general arrangement of the transducer mounting and controls.
Figure 7:
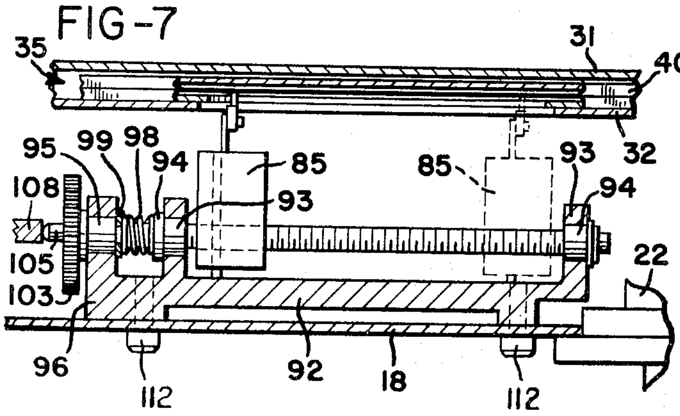
FIG. 7 is an enlarged cross-sectional view of the mounting and controls for the transducer, showing the carriage and a cassette therein in the playing position.
Figure 8:
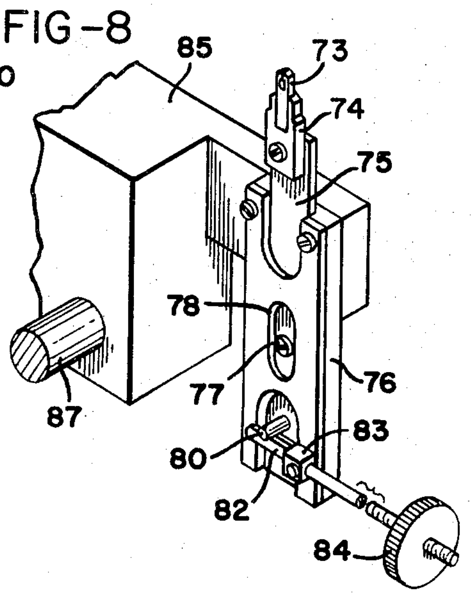
FIG. 8 is a perspective view of the transducer mounting and the counterbalanced support therefor.

Referring to FIGS. 6, 7, and 8, a transducer 73, preferably in the form of a single magnetic recording/playback head having a very narrow width and a small gap width in the order of 40 microinches, is mounted for cooperation with the recording media (later described) within the cassette 40 when the carriage supports the cassette in the playing position as shown particularly in FIG. 7. The transducer 73 is suitably fixed within a supporting block 74 which is arranged for interchangeable mounting on a supporting slide 75 that is vertically movable within a support 76, being guided for strict vertical movement by a guide pin 77 which protrudes from the slide 75 through a slot 78 in the support 76.

A further pin 80 extends from a lower portion of slide 75 through an aperture in the support, and in position to engage one end of a control arm 82. This arm is pivotally mounted to the support 76 through a hinge block 83, and a counterweight 84 is threaded into the outer end of the arm 82. Adjustment of the counterweight toward and away from the hinge block 83 determines the force with which the transducer 73 is urged upward to interface with the recording media in the cassette.

The entire transducer holding mechanism is supported for movement in a direction radially of the cassette by means of a main supporting block 85 to which the support 76 is fastened. This block contains suitable holes which are received into parallel guide rods 87 that support the block 85 for precise sliding movement. A lead screw 90 is threaded to a nut (not shown) fixed within the block 85, such that rotation of the lead screw produces a translational movement of the block 85 radially of the carriage 30 (and a cassette therein) as shown generally in FIGS. 6 and 7. The transducer and its supporting mechanism are shown in full lines in the outermost position and in dash lines in the innermost position, indicating generally the range of movement of the transducer.

The rods 87 and lead screw 90 are supported parallel to each other on a bracket 92 which extends parallel to a radius of the carriage 30 and which includes a pair of upstanding ears 93 to which opposite ends of the rods 87 are secured. The lead screw 90 is mounted within bushings 94 within these ears, and extends through a further bushing 95 at the outermost end of the bracket, that bushing being supported within a further upstanding ear 96.

The lead screw is supported for limited longitudinal movement within the bushings, being shown in its outermost position where a spring 98 presses against a snap ring 99 on the lead screw, biasing it to that position. A stepping motor 100 is supported on the bracket to one side of the rods and block 85, as shown in FIG. 6, and is connected to rotate the lead screw through a pair of meshing gears 102 and 103, the former of which is fixed to the output shaft of the stepping motor, while the gear 103 is fixed to the end of the lead screw 90. Suitable stepping motor controls (not shown) are provided to step the motor so as to cause the transducer to follow different circular paths on the recording disc.

The tip 105 of the lead screw projects beyond gear 103 and engages with an adjustment cam 108 which is rotatably mounted on a supporting pivot pin 109 extending upward from the base panel 18. An adjustment arm 110 extends from cam 108 through an aperture in the front panel 15 (and a corresponding aperture in the front of bracket 16) to control rotation of cam 108. Cam 108, in turn, presses against the end 105 of lead screw 90 and provides a fine adjustment of the position of block 85 and the transducer mechanism, to peak the transducer output signal by bringing the transducer to the center of the selected circular path on the recording disc. Bracket 92 is fastened to panel 18 by bolts 112, enabling the transducer, its mounting, and its drive all to be replaced as a sub-assembly.

Figures 9, 10, 11, 12, 13, 14:
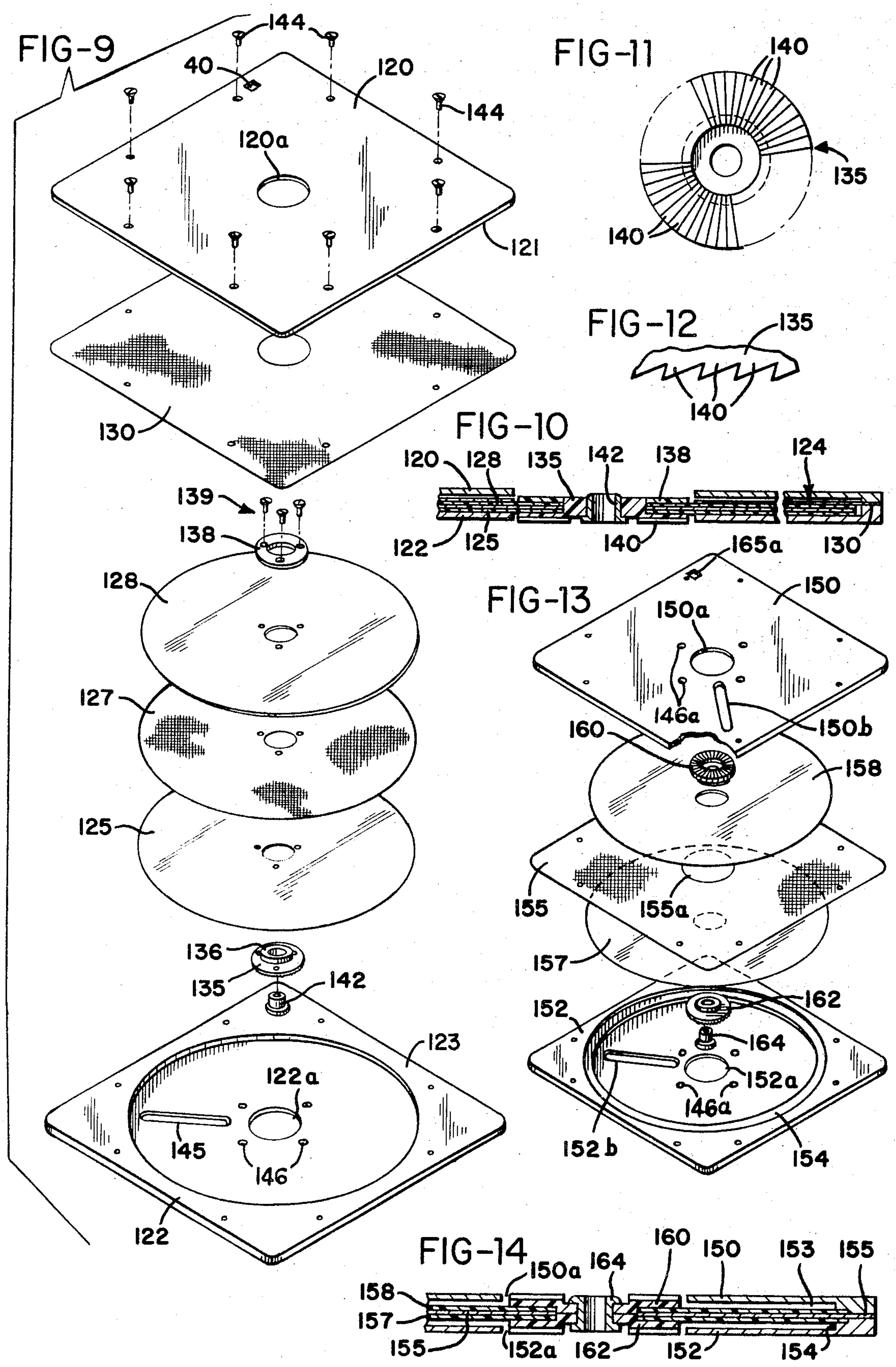
FIG. 9 is an exploded perspective view illustrating the component parts of a cassette and the recording media contained therein.
FIG. 10 is a foreshortened cross-sectional view, on an enlarged scale, showing details of the assembled cassette and its driven parts.
FIG. 11 is a plan view of the driven hub within the cassette.
FIG. 12 is an enlarged view showing a fragment of the teeth on the driven hub.
FIG. 13 is an exploded view of a modified form of cassette.
FIG. 14 is a cross-sectional view of a portion of the cassette shown in FIG. 13.

FIG. 9 illustrates the components, and their method of assembly, making up a single sided cassette which may be used with the mechanism described above, and which constitutes a further feature of the invention. The cassette comprises an outer case consisting of an upper section 120 having a rim 121 and a lower section 122 having a rim 123. The rims 121 and 123 separate the cassette sections 120 and 122 to provide each of them with an internal shallow central opening or cavity, preferably of circular configuration, the cavity in the lower section 122 being shown in FIG. 9 on the upwardly facing portion of the lower section 122.

When the sections of the case are assembled, the cavities in sections 120 and 122 cooperate to define a shallow internal chamber 124, within which a disc 125 of thin flexible material is supported for rotation. This disc has a magnetic recording surface on its underside (as viewed in FIG. 9) and constitutes the recording media of the cassette. In general it is constructed of a thin flexible substrate on which a coating of iron oxide particles (or equivalent) is formed to produce the magnetizable surface, and in general the disc 125 is constructed of the same thin material as used for magnetic tape recording.

In order to provide some support for this thin flexible disc, a backing disc of slightly thicker material, such as silk-screen cloth, is provided at 127, and in one successful embodiment, a further backing disc 128 was provided in the form of another disc of the recording material, although it is not necessary that the magnetizable coating be employed thereon. A stationary flexible backing sheet 130 is secured across the cavity in the underside of the case upper section 120. The member 130 preferably is constructed of a thin cloth-like material, such as a porous silk-screen cloth, and it is stretched across the cavity in the upper section 120 before the case is assembled, preferably by securing the cloth divider 130 to the upper case section with a suitable adhesive, such that the resultant sub-assembly is similar to a drum head with the cloth secured taughtly over the cavity. In the assembled cassette, the member 130 acts as a flexible divider extending almost entirely across the internal chamber 124.

The three disc members 125, 127, and 128 are assembled to each other by fastening them to the back side of a driven hub 135 which is provided with an upper circular extension 136 that passes through the apertures in the three discs. The clamp ring 138 is fastened through a number of screws 139 to the driven hub 135, assembling the discs to the hub for rotation therewith. The undersurface of hub 135 is provided with a plurality of radially extending undercut teeth 140 which face along the axis of the hub and the discs assembled thereto, arranged in a circle around the face of the hub 135. The toothed configuration of hub 135 is complementary to the toothed arrangement on the face of the drive hub 135 such that these two parts have a tendency to draw together in one direction of rotation as they are brought into contact.

Central holes are provided in the flexible divider 130, and at 120*a* in the upper case section and at 122*a* in the lower case section, providing access to the hub from the exterior of the cassette. The hole 120*a* is not essential, but from a practical standpoint it is desirable since the driven hub assembly together with the discs attached thereto and the central portion of the flexible divider 130, are all movable transversely of the case to a limited extent, and the hole 120*a* prevents unwanted friction between the back side of the driven hub and the adjacent upper section of the cassette case. A locating bushing 142 is received within the driven hub 135, to receive the locating end 26 of the drive shaft, and thus to align the toothed faces of the drive and driven hubs. In a typical embodiment of the cassette, the upper and lower case sections were constructed of a thin essentially rigid synthetic material, capable of being molded to adapt the parts to mass production, and the hub drive teeth 140 were located substantially flush with the parts of section 122 surrounding the drive opening 122 *a.* A number of assembly screws 144 are used to retain the case sections to each other, containing the other parts within the cassette case. An elongated access opening 145 is provided in the lower section 122, extending radially of the central opening 122*a*, and forming an access for the transducer 73 to the recording surface of the disc 125.

Inwardly of the access opening there are one or more air access or entrance openings 146. When the disc assembly is spinning, a flow of air will be induced through these openings and outwardly along the disc, providing a film of air between the disc and the inner surface of the cassette section 122. The opening 145 provides egress for the air flow, hence the flow is continuous during operation.

The recording media disc 125 is quite thin and in a static (not rotating) condition it is incapable of sustaining itself in a plane. A typical material used for this purpose is standard recording tape, which may be of a specially prepared type as disclosed in copending U.S. Patent application Ser. No. 224,187, filed Feb. 7, 1972, and having a thickness of about 1 mil (0.001 inch). The somewhat thicker disc 127 provides some backing support for the disc 125 to prevent it from wrinkling, particularly during starting and stopping of rotation. The stationary divider or membrane 130 is sufficiently flexible to provide a compliant stationary backing for the rotating disc assembly, and the tape disc 128 is provided between the stationary divider 130 and the cloth disc 127 primarily as a convenient form of device to minimize friction between these parts during rotation. The surface of the film disc 128 has a smooth and somewhat slippery surface which minimizes friction against the membrane or divider 130 during rotation of the disc members. It is possible, however, to provide a smooth lubricating coating on the backing disc 127, or even to form the magnetizable coating on a somewhat thicker and more self-supporting member which also has a suitable non-friction coating, thereby providing the disc assembly as a single but more complex piece which can be attached to the driven hub.

In any event, the transducer 73 projects through the slot or access opening 145 into contact with the recording surface of the disc 125, and the force of the counterweight system urges the transducer into an intimate interface with the recording surface, the outer parts of the disc assembly and the flexible divider 130 providing a compliant backing or resistance which keeps the recording disc 125 in close association with the transducer. In addition, centrifugal force on the recording disc 125 itself, considering that the disc assembly is commonly driven at speeds in the order of 1,800 rpm, also functions to urge the disc into a plane, and to resist the indenting force of the transducer into this plane of rotation.

FIGS. 13 and 14 disclose a modified form of cassette and enclosed disc assembly, particularly adapted for two-sided interchangeable use. Case sections 150 and 152, which may be identical in arrangement, are each provided with shallow circular openings that combine when the sections are assembled to form a circular cavity 153 within the cassette. Each of these circular depressions may include an annular peripheral shoulder 154 which cooperate to form a shallower edge of the chamber for receiving the periphery of the recording discs. The divider 155 is stretched between the case sections and fastened thereto, and it together with each of the case sections is provided with a central aperture for surrounding the hub assembly.

Suitable discs of recording media 157 and 158, each having a magnetizable surface thereon facing toward the adjacent case section, are fastened to a similar hub assembly which comprises upper and lower toothed driven hub sections 160 and 162, each having a toothed configuration of the same type disclosed in FIGS. 11 and 12. These hub sections are fastened together and clamp the center of the recording discs 157 and 158, however, the central aperture 155*a* in the divider is of a greater diameter, hence the two disc assemblies together with the assembled hub parts, is loosely supported at its center on the flexible divider 155, retaining the hub assembly generally within the openings 150*a* and 152*a* of the case sections. A locating spindle or bushing 164 extends through the hub sections, and may be staked to hold these parts in an assembled condition.

Each of the case sections is provided with an elongated access opening or slot 150*b* and 152*b*, together with appropriate retaining notches such as 165*a*, these openings being located in symmetrical fashion such that the appropriate access opening will be facing the transducer, and the appropriate retainer notch will engage the retainer arm 62, depending upon which side of the cassette is facing downward when it is inserted in the carriage. It is understood that appropriate additional disc members can be added to this form of the cassette, as may be required for support and/or antifriction purposes.

FIGS. 15–24 disclose another modified form of cassette and a modified carriage and suspension system for supporting the cassette within housing 10. A carriage support panel 170 (FIGS. 15 and 17) is attached to the inner mounting bracket 16 by screws 171 which pass through screw holes 172 in panel 170. Panel 170 has two locator points 175 threadably mounted on threaded shafts 176 near the front of panel 170. The locator points may be adjusted vertically with respect to panel 170 by turning the points inwardly or outwardly on their shafts 176. A corresponding support pad 177 is similarly threaded into panel 170 on a shaft 178 near the rear of the panel. Points 175 and pad 177 form a vertically adjustable three point suspension system on the carriage support panel 170.

The cassette carriage 180 is attached to bracket 16 of housing 10 by means of parallel arms 182 having appropriate bushings 183 thereon. Arms 182 support the carriage for movement between a lower operative position (solid lines in FIG. 15) in which carriage 180 rests upon carriage support panel 170 and an upper or loading position (dotted lines) in which the opening or loading slot 184 into the carriage chamber 185 is brought adjacent the housing loading opening 47 for insertion and removal of the tape cassette.

The cassette carriage 180 has a pair of locator point openings 188 and a support pad opening 189 in the bottom 190 of the carriage, opposite the corresponding locator points 175 and pad 177, allowing the points and pad to pass into the carriage chamber 185 when the carriage rests upon support panel 170. The cassette carriage 180 and carriage support panel 170 also have respective drive hub openings 194 and 195 to provide access for the drive hub 25 to the corresponding cassette driven hub 200 within chamber 185. Similarly, transducer access slots 202 and 203 in the carriage 180 and panel 170, respectively, provide access for the transducer 73 to the cassette recording disc.

The tape cassette 210 includes a cassette frame 212 having an inner rim 213 whcih separates a cassette upper cover portion 214 and a cassette lower cover portion 215 attached to the cassette frame 212. Each of the upper and lower cover portions 214 and 215 is fabricated of an appropriate lightweight, rigid material, which in the illustrated case is an aluminum-cardboard-aluminum sandwich. The upper cover portion 214 thus has outer an inner thin sheets of aluminum 214*a* (e.g. approximately 0.010 inch thick) adhered to a thin layer of cardboard 214*b* (e.g. approximately 0.060 inch thick). The lower cover portion 215 similarly comprises aluminum inner and outer sheets 215*a* and a cardboard center layer 215*b* of the same dimensions as those of cover portion 214. An optional vinyl decorative cover 217 may be attached to the top of the cassette 210 if desired.

Suspension receiving openings 220 having metallic liners 221 are located in the cassette near the front corners thereof to receive the locator points 175 of the cassette suspension system when the cassette is placed within carriage chamber 185 and lowered into the operative position adjacent carriage support panel 170. The carriage chamber 185 is of a height greater than the thickness of the cassette 210 so that the three point suspension system 175 and 177 may lift the cassette off the floor of the carriage and support the cassette entirely independently of the carriage 180. By this means the cassette may be located very precisely with respect to the base panel 18 on which the drive motor 20, drive hub 25, and transducer 73 are mounted. The vertical position is adjusted by turning the supports 175 and 177 inwardly or outwardly of the support panel 170, and the horizontal position of the cassette 210 is precisely determined by entry of the locator points 175 into the metallic liners 221. The fit of the locator points 175 and support pad 177 in panel 170 should therefore be tight in order to maintain these points in the proper vertical adjustment.

The cassette internal chamber 225 is lined adjacent the upper and lower cover portions 214 and 215, respectively, by a compliant liner material 228 and 229, such as a cotton fabric which is available under the name Velveteena. The fabric consists of a woven base of cotton thread onto which short cotton fibers are applied by a flocking process. Each fabric layer, approximately 0.035 inch thick, provides a resilient and compliant, low friction liner for the recording disc 230, and keeps the disc clean without creating a static electrical charge on the disc. The recording disc 230 itself is the same as recording discs 125, 157, and 158, and is made accessible to the transducer 73 through a transducer access slot or opening 232 passing through the cassette lower cover portion 215 and liner 229.

In order to enhance the compliant interface between the recording disc 230 and the transducer 73, Mylar shims 235 (FIG. 18), approximately 0.018 inch thick and ¼ inch wide, are provided on either side of access slot 232 to cause the liner 229 thereadjacent to lift the recording disc 230 as it passes across slot 232. A similar shim 236 is attached to cover portion 214 opposite slot 232, and between aluminum sheet 214*a* and the attached liner 228, to bias the recording disc 230 toward the transducer opening 232, thus supporting disc 230 across slot 232 and across shims 235 for a highly compliant interface with the transducer 73. The interface which is achieved is generally the same as that achieved with the apparatus disclosed in copending U.S. application Ser. No. 183,856, Filed Sept. 27, 1971, assigned to the assignee of the present application.

A torque transmission disc 240 of Mylar material (approximately 0.009 inch thick) is adhered to the recording disc 230 and is also attached to the cassette driven hub 200 to assist in transmitting drive torque from the driven hub to recording disc 230. The torque transmission disc 240 is thus of a diameter greater than cassette hub 200 but of a diameter smaller than the distance to innermost edge of the transducer access opening 232.

An orientation notch 245 may be provided in the rear of cassette 210 to receive a corresponding boss or projection (not shown) in the carriage 180 to prevent cassette 210 from being inserted in the wrong position. The cassette may also be provided with a selectable erase lock-out control, as desired, to prevent accidental erasure of the recorded program.

Figures 18, 19, 20, 21, 22, 23, 24:
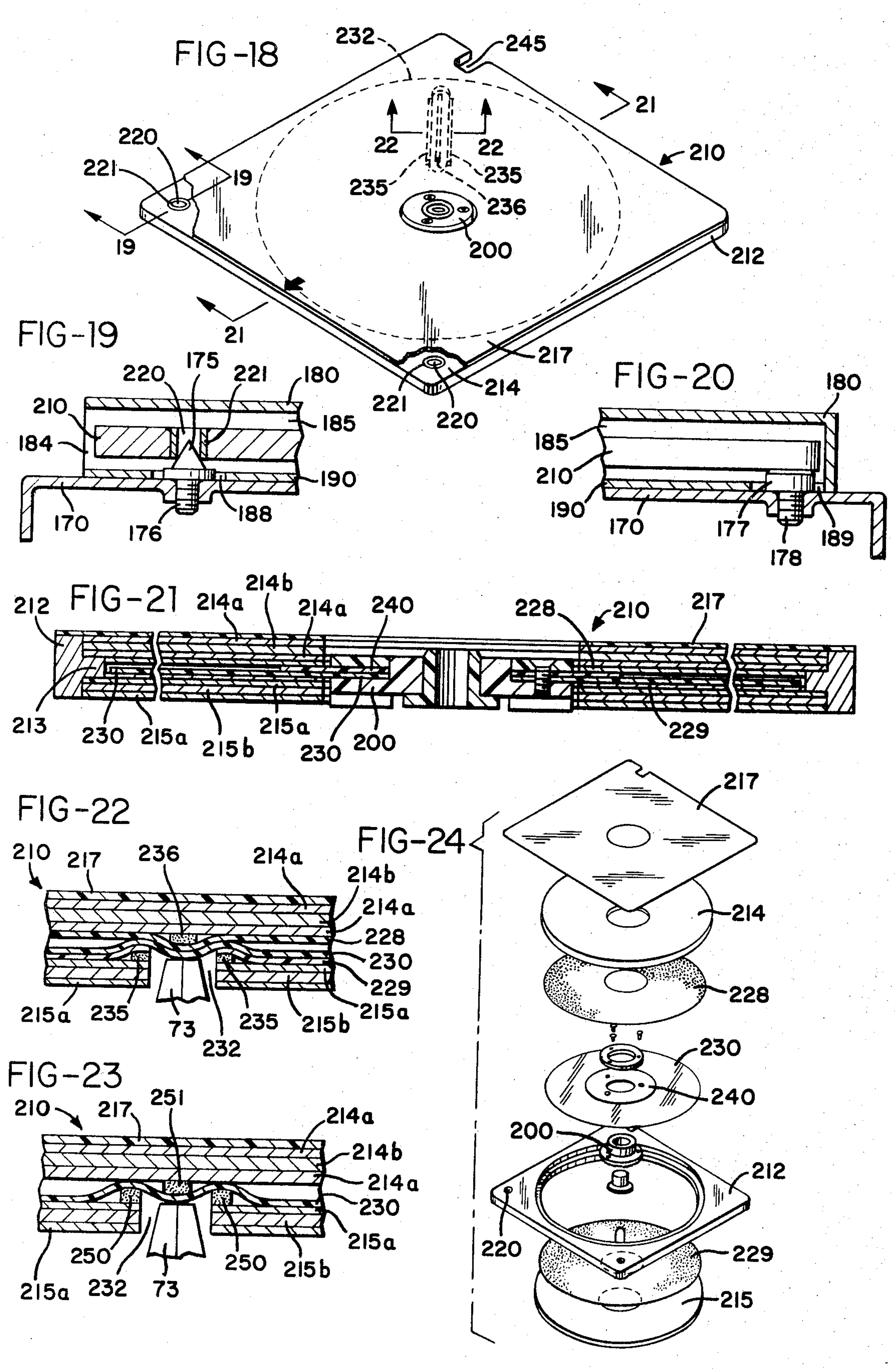
FIG. 18 is a perspective view of the modified form of cassette shown in FIG. 15.
FIG. 19 is a cross-sectional view taken on lines 19—19 of FIGS. 16, 17, and 18, and showing the carriage in the lowered position resting on the carriage support panel and the cassette therein being supported and located on one of the vertically adjustable points of the three point cassette suspension system.
FIG. 20 is a cross-sectional view similar to FIG. 19 taken on lines 20—20 of FIGS. 16 and 17.
FIG. 21 is a foreshortened cross-sectional view of the cassette of FIG. 18 taken on line 21—21 thereof, on an enlarged scale, and showing details of the assembled cassette and its driven parts.
FIG. 22 is a cross-sectional view of the FIG. 18 cassette taken on line 22—22 thereof, and showing the shims adjacent the transducer access opening guiding the recording disc thereacross in compliant interface with a magnetic transducer.
FIG. 23 is a cross-sectional view similar to FIG. 22 of a modified form of cassette similar to that of FIG. 22.
FIG. 24 is an exploded view of the cassette shown in FIG. 18.

FIG. 23 shows a modification of the cassette 210. In this case, the Mylar shims 235 and 236 are replaced by cotton fabric shims 250 and 251, respectively, in the same locations as the Mylar shims 235 and 236, and the cassette cover portion chamber surfaces 214*a* and 215*a* are unlined.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A magnetic recording system including a deck and a magnetic disc recording cassette, comprising
a base,
a drive hub mounted in said base and means for rotating said drive hub,
a magnetic transducer movably mounted in said base in spaced relation to said drive hub,
means for moving said transducer to selected positions along a path toward and away from said drive hub,
a thin flexible recording disc incapable of sustaining itself in a plane and having at least one magnetizable surface,
a cassette surrounding said disc and having an elongated opening therein adjacent said magnetizable surface and aligned with the path of movement of said transducer providing access for said transducer to said surface,
a driven hub attached to said disc and accessible to said drive hub adjacent the surface of said cassette,
flexible backing disc means in contact with substantially the entire back surface of said flexible recording disc and attached to said driven hub for rotation with said hub and recording disc to provide additional support for said recording disc, said flexible backing disc means providing the sole additional support for said flexible recording disc when engaged with said transducer to provide a compliant backing for said flexible recording disc for compliant interfacing with said transducer,
and support means on said base to locate said cassette in a predetermined position within said base to align said drive hub with said driven hub and to align said elongated opening with said transducer.

2. A magnetic recording system as defined in claim 1, wherein said hubs have interengaging teeth forming a unidirectional rotary drive connection therebetween,
and means holding said carriage in a playing position wherein said teeth on said hubs are brought into engaging position.

3. A magnetic recording system as defined in claim 1, wherein said means for moving said transducer includes a bracket extending parallel to a radius of said disc adjacent said elongated opening in said cassette, a lead screw mounted in said bracket also parallel to a radius of said disc, a supporting block carrying said transducer and movable along said bracket in response to rotation of said lead screw, and a motor connected to rotate said lead screw.

4. A system as defined in claim 3, wherein said motor is a stepping motor and controls therefor to step said motor causing said transducer to follow different circular paths on said recording disc.

5. A magnetic recording system as defined in claim 1 wherein the means to locate said cassette comprises a polygonal shaped carriage and said cassette has a corresponding polygonal shape to align it with said carriage.

6. A magnetic recording system as defined in claim 5, including a retaining mechanism on said carriage operative to position said cassette within said carriage in the playing position.

7. A magnetic recording system as defined in claim 6, including means for releasing said retaining mechanism, and ejector means operable upon release of said retaining mechanism to move said cassette at least partially out of said carriage.

8. A magnetic recording system including a deck and a magnetic disc recording cassette, comprising
a base,
a drive hub mounted in said base and means for rotating said drive hub,
a magnetic transducer movably mounted in said base in spaced relation to said drive hub,
means for moving said transducer to selected positions along a path toward and away from said drive hub,
a thin flexible recording disc incapable of sustaining itself in a plane and having at least one magnetizable surface,
a driven hub attached to said disc,
flexible backing disc means contacting substantially the entire back surface of said flexible recording disc and attached to said driven hub for rotation with said hub and recording disc to provide additional support for said recording disc and to provide a compliant backing for said flexible recording disc for compliant interfacing with said transducer,
and support means on said base to locate said discs in a predetermined position within said base to align said drive hub with said driven hub.

9. The system of claim 8 further comprising stationary flexible backing sheet means secured opposite the back surface of said flexible backing disc means to provide a compliant backing for said flexible recording disc and backing disc means during rotation thereof and interfacing of said transducer therewith.

10. The apparatus of claim 8 wherein said flexible backing disc means includes a backing disc of thin cloth-like material contacting substantially the entire back surface of said recording disc.

11. The system of claim 10 wherein said flexible backing disc means includes a further backing disc of flexible plastic material contacting substantially the entire back surface of said disc of cloth-like material.

* * * * *

UNITED STATES PATENT OFFICE
CERTIFICATE OF CORRECTION

PATENT NO. : 3,833,926
DATED : September 3, 1974
INVENTOR(S) : Robert P. Hall, Sr.

It is certified that error appears in the above-identified patent and that said Letters Patent are hereby corrected as shown below:

Column 5, line 6, delete "againt" and insert --against--.

Column 6, line 64, delete "taughtly" and insert --tautly--.

Column 8, line 15, delete "outer" and insert --other--.

Column 8, line 16, delete "and" and insert --or--.

Column 9, line 40, delete "whcih" and insert --which--.

Column 9, line 47, delete "an" and insert --and--.

Signed and sealed this 3rd day of June 1975.

(SEAL)
Attest:

RUTH C. MASON
Attesting Officer

C. MARSHALL DANN
Commissioner of Patents and Trademarks

Disclaimer 3,833,926.—*Robert P. Hall*, Auburn, Calif. MAGNETIC DISC RECORDER AND CASSETTE WITH COMPLIANT RECORDING DISC HAVING FLEXIBLE SUPPORT MEANS. Patent dated Sept. 3, 1974. Disclaimer filed Dec. 5, 1975, by the assignee, *Arvin Industries, Inc.*

Hereby enters this disclaimer to claims 8 and 10 of said patent.

[*Official Gazette March 9, 1976.*]